United States Patent [19]
Kirschner et al.

[11] Patent Number: 5,802,968
[45] Date of Patent: Sep. 8, 1998

[54] APPARATUS FOR CRUSHING CONTAINERS

[75] Inventors: Jonathan Kirschner, Powder Springs, Ga.; Frederick R. Handren, Arlington, Va.

[73] Assignee: The Coca-Cola Company, Atlanta, Ga.

[21] Appl. No.: 637,898

[22] Filed: Apr. 26, 1996

[51] Int. Cl.⁶ .................................................. B30B 9/32
[52] U.S. Cl. .................... 100/233; 100/258 A; 100/293; 100/902
[58] Field of Search ................ 100/233, 258 A, 100/280, 283, 293, 902

[56] References Cited

U.S. PATENT DOCUMENTS

| | | | |
|---|---|---|---|
| D. 274,624 | 7/1984 | DiFede | 100/293 |
| 1,401,800 | 12/1921 | Letts | 100/283 |
| 1,402,433 | 1/1922 | Monroe | 100/280 |
| 1,727,979 | 9/1929 | Hunt | 100/293 |
| 2,379,357 | 6/1945 | Humphrey | 100/293 |
| 2,446,898 | 8/1948 | Alvarez | 100/233 |
| 2,665,632 | 1/1954 | Kawa . | |
| 3,374,730 | 3/1968 | Cain | 100/233 |
| 3,948,164 | 4/1976 | Pobuda et al. | 100/233 |
| 4,213,384 | 7/1980 | Telling . | |
| 4,316,410 | 2/1982 | Davis, Jr. . | |
| 4,333,396 | 6/1982 | Longnecker . | |
| 4,476,779 | 10/1984 | Hasebe et al. . | |
| 5,072,852 | 12/1991 | Smith et al. . | |
| 5,233,917 | 8/1993 | Handzlik . | |
| 5,265,530 | 11/1993 | Perhacs et al. . | |
| 5,448,946 | 9/1995 | Laux | 100/902 |

FOREIGN PATENT DOCUMENTS

| | | | |
|---|---|---|---|
| 6-198495 | 7/1994 | Japan | 100/902 |

Primary Examiner—Stephen F. Gerrity

[57] ABSTRACT

A container crushing apparatus which is particularly useful with plastic beverage containers employs a stationary presser member, a confronting movable presser member, links which constrain the movable presser member for movement along an arcuate path toward and away from the stationary member, and a lever for effecting movement of the movable presser member along the arcuate path. The confronting surfaces of the presser members carry an elastomeric material for gripping the sidewalls of a container to be crushed. As the movable presser member is forced toward the stationary presser member, the sidewalls of the container are displaced toward each other and longitudinally, and the container base pivots toward a position generally aligned with the sidewalls. The lever is connected between the presser members for increased force multiplication as the crushing operation progresses.

22 Claims, 4 Drawing Sheets

APPARATUS FOR CRUSHING CONTAINERS

BACKGROUND OF THE INVENTION

The present invention relates to an apparatus for crushing containers and more particularly, an apparatus for crushing beverage bottles, such as those formed of polyethylene terephthalate (PET).

Crushing beverage containers, to reduce their volume before placement in landfills or for storage prior to recycling, is widely practiced and has led to the development of a number of apparatuses which facilitate reducing the containers to a compact size and shape.

Some of the known apparatuses incorporate a linearly moving presser member which acts on an endwall of a container to reduce it lengthwise to a flattened disc. Other known apparatuses employ a linearly moving presser member which acts on the container sidewall to reduce the container widthwise to a flattened form. Another group of known apparatuses employ pivoted presser members which force the container sidewalls together.

Plastic beverage bottles, particularly PET bottles which are becoming more prevalent daily, are particularly resistant to conventional techniques for crushing them into flattened form. The resilience of the PET encourages spring-back to the original container shape, and the bottle base exhibits rigidity which strongly opposes side-to-side crushing forces.

Along with the continuing need for means to reduce the volume of all containers for introduction into landfills or for storage prior to recycling there is a particular need for an apparatus which can effectively reduce PET bottles to a flattened shape. To encourage its widespread acceptance, such an apparatus should be of simple and inexpensive construction and should be easy to use.

SUMMARY OF THE INVENTION

Accordingly, it is a primary object of the present invention to provide an apparatus which effectively crushes containers, including those such as PET beverage bottles which are especially resistant to crushing by conventional techniques.

It is another object of the present invention to provide an apparatus for crushing containers employing a simple arrangement of stationary and movable presser members which will effectively crush many kinds of containers, including PET bottles, is of simple and inexpensive construction and is easy to use.

The foregoing objects of the present invention, and others as well are realized by providing an apparatus for crushing containers comprising: a stationary member having a pressing surface; a movable member having a pressing surface disposed in confronting relation to the pressing surface of the stationary member; first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other; and second means for effecting movement of the movable member between the first and second positions, said second means comprising a lever connected between the plates.

The objects of the present invention are further realized by providing an apparatus for crushing containers comprising: a stationary member having a pressing surface; a movable member having a pressing surface disposed in confronting relation to the pressing surface of the stationary member; first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other; and second means for effecting movement of the movable member between the first and second positions, said second means comprising a lever pivotally connected to the stationary presser member and slidably engaging at least one projection on the movable presser member.

The detailed description which follows will afford a comprehensive understanding of the present invention. However, the specific examples described are intended to be illustrative only and should not be construed as limiting the scope of the present invention.

DESCRIPTION OF THE PREFERRED EMBODIMENTS

Figure 1:
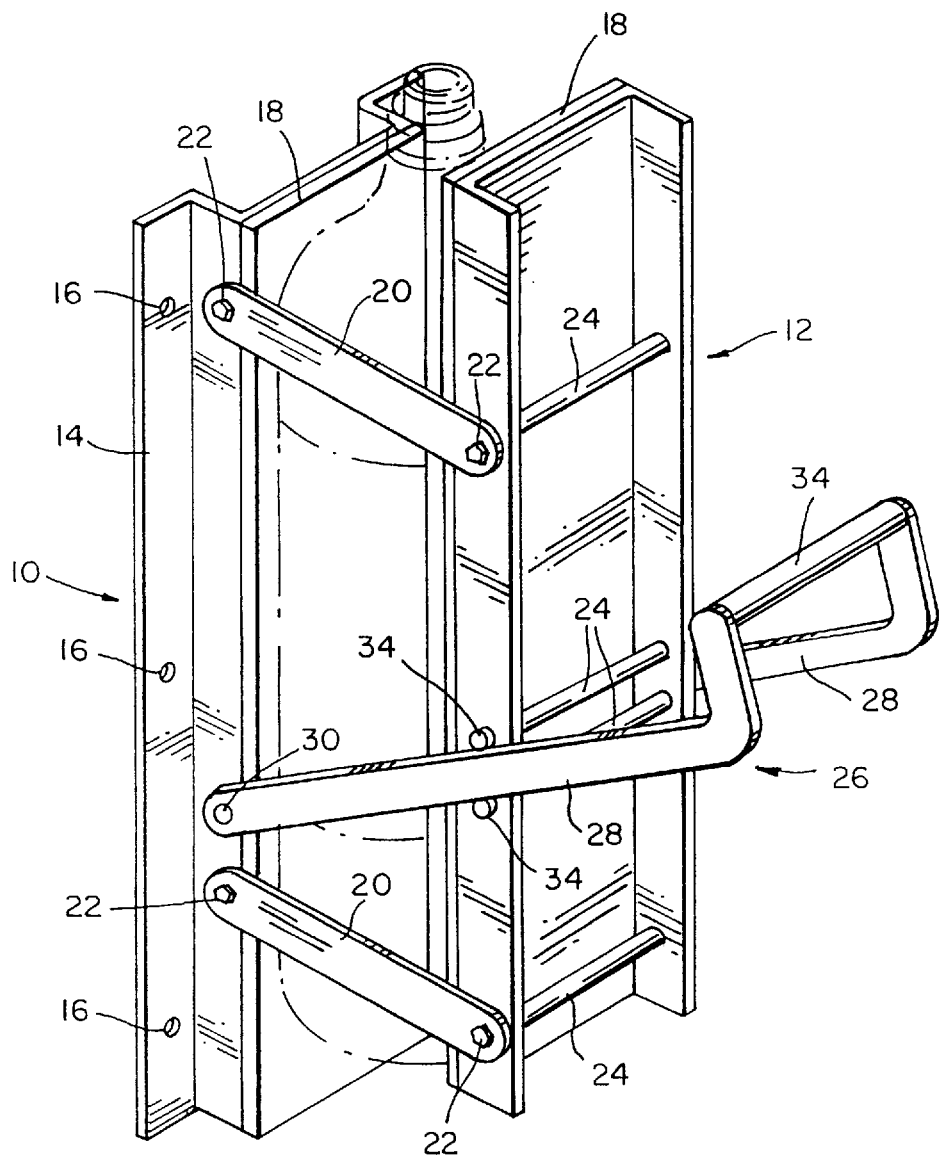
FIG. 1 is a perspective illustration of a container crushing apparatus of the present invention.
Figure 2:
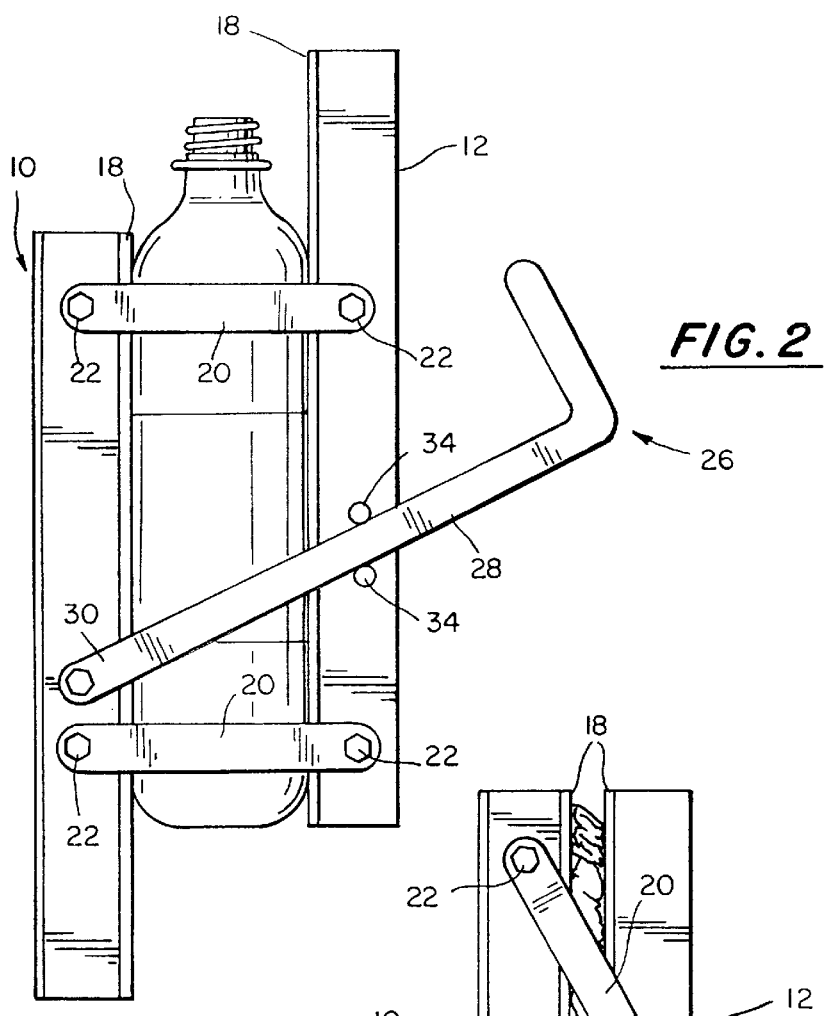
FIG. 2 illustrates the presser members of the present invention in an open position.
Figure 3:
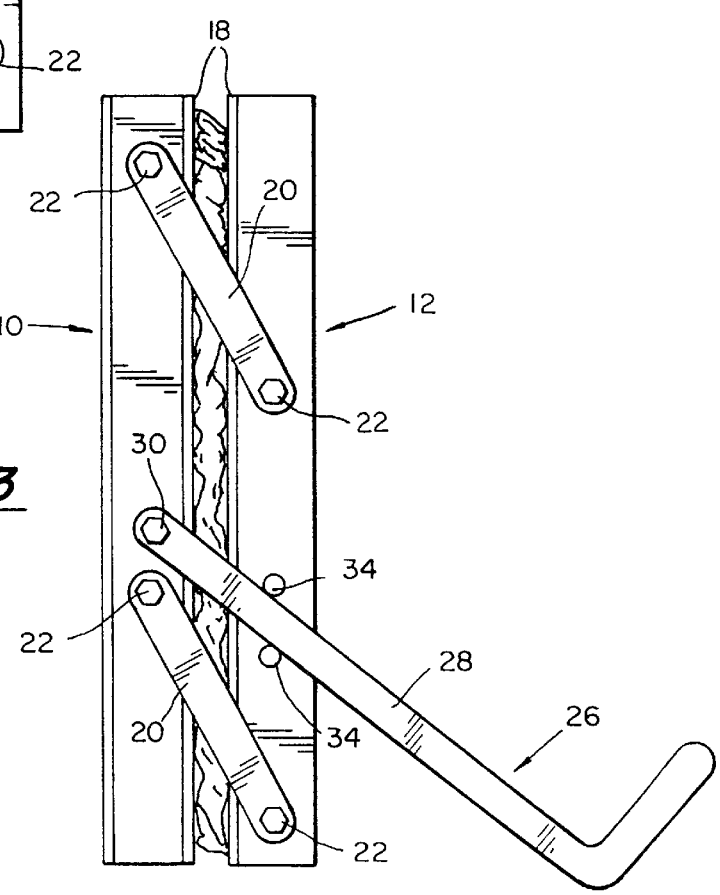
FIG. 3 illustrates the presser members of the present invention in a closely spaced position.

As illustrated in FIGS. 1, 2 and 3, a container crushing apparatus constructed according to the present invention comprises a pair of presser members 10 and 12. The presser member 10 is stationary and includes laterally extending flanges 14 with fastener openings 16 by which the presser member may be secured, by screws, for example, to a fixed support such as a wall. Presser member 12 is movable along an arcuate path toward and away from the stationary presser member, as will be described. An elastomeric material presenting a high friction surface is applied partially or completely to the confronting pressing surfaces of the presser members. As shown, a layer of elastomeric material 18 covers the pressing surface of each presser member. The presser members are wide enough to accommodate a single container to be crushed and may be wider to accommodate two or more containers side-by-side.

Extending between the presser members are links 20 which are pivotally connected to each of the presser members. Two pairs of links are shown. The links in each pair are laterally spaced from each other and are connected near their ends to the sides of the presser members. The pairs of links are longitudinally spaced from each other, one of the pairs being connected near the upper ends of the presser members and the other pair being connected near the lower ends of the presser members. As particularly illustrated in FIG. 1, the presser members comprise lengths of channel stock, and the links are connected through the channel flanges by fasteners 22 extending into the ends of spacer rods 24 disposed between the flanges.

The links are dimensioned to allow a separation between the presser members which will accommodate a container to be crushed. As shown in FIGS. 1 and 2, a two-liter plastic beverage bottle is positioned between the presser members. The upper and lower pairs of links form a parallelogram linkage which constrains the movement of presser member 12 to an arcuate path having a downward and upward longitudinal components and inward and outward components with respect to the stationary presser member. As shown in FIG. 3, at the end of a crushing operation, the plates are separated by a narrowed space which accommodates the crushed container.

As best shown in FIG. 1, a lever 26 serves as a means for effecting movement of presser member 12 along the arcuate path toward and away from presser member 10. The lever includes arms 28 which embrace the sides of presser members and are pivotally connected at their free ends 30 to stationary presser member 10. A handgrip 32 is fastened between the other ends of the lever arms. Intermediate regions of the lever arms extend between and slidably engage longitudinally spaced, laterally extending projections at the sides of movable presser member 12. The projections may be formed by bolts with heads 34 which overlie the upper and lower edges of the lever arms. The shanks of the bolts extend into the ends of spacer rods 24 The illustrated connection between the lever arms and the movable presser member uses readily available hardware items and is very effective for transmitting force applied to the lever handgrip to the movable presser member. However, variations of this slidable connection may be used. For example, each lever arm may contain a slot receiving a laterally extending projection at each side of the movable presser member.

In operation of the container crushing apparatus, a container to be crushed, such as a plastic beverage bottle, is introduced between the presser members in their open position, as illustrated in FIGS. 1 and 2. A slight downward movement of the lever brings the presser members together so that the confronting surfaces of the presser members 10, 12 engage the opposed sidewalls of the bottle. The friction between the elastomeric material on the presser members and the bottle sidewalls is ordinarily sufficient to prevent the bottle from falling from the space between the presser members. Additional downward force applied to the lever handgrip 32 effects a movement of presser member 12 downward and inwardly toward stationary presser member 10. Due to the grip of the elastomeric material on the bottle sidewalls, a longitudinal displacement of the bottle sidewalls occurs, that is, the side of the bottle engaging the movable presser member moves longitudinally downward with respect to the side engaging the stationary presser member. As this occurs, the base of the bottle undergoes a pivoting movement (clockwise as shown in the drawings) about an axis located in the vicinity of the junction between the bottle base and sidewall adjacent to the stationary presser member. The downward pivoting of the bottle base significantly reduces the force needed to bring the bottle sidewalls together. The continued application of downward force to the lever handgrip completes the pivoting movement of the bottle base to a position in which it is folded against the bottle sidewall engaged by the movable presser member; concurrently, the bottle sidewalls will be forced closely together. FIG. 3 shows the crushed bottle between the drawn-together presser members.

The force applied to the movable presser member is a multiple of the force applied to the lever handgrip 32 and is determined in part by the distance between the connections of the lever arms 28 to the stationary and movable presser members. As this distance shortens, the multiple becomes greater. As the lever moves from the position shown in FIGS. 1 and 2 to the position shown in FIG. 3, the distance between the pivotal connection with the stationary presser member and the sliding engagement with the movable presser member becomes shorter, and the force multiple becomes correspondingly larger. Because of the enhanced leverage near the end of the crushing movement, relatively light force applied at the handgrip can complete the crushing of a container in the apparatus of the present invention.

Figure 4:
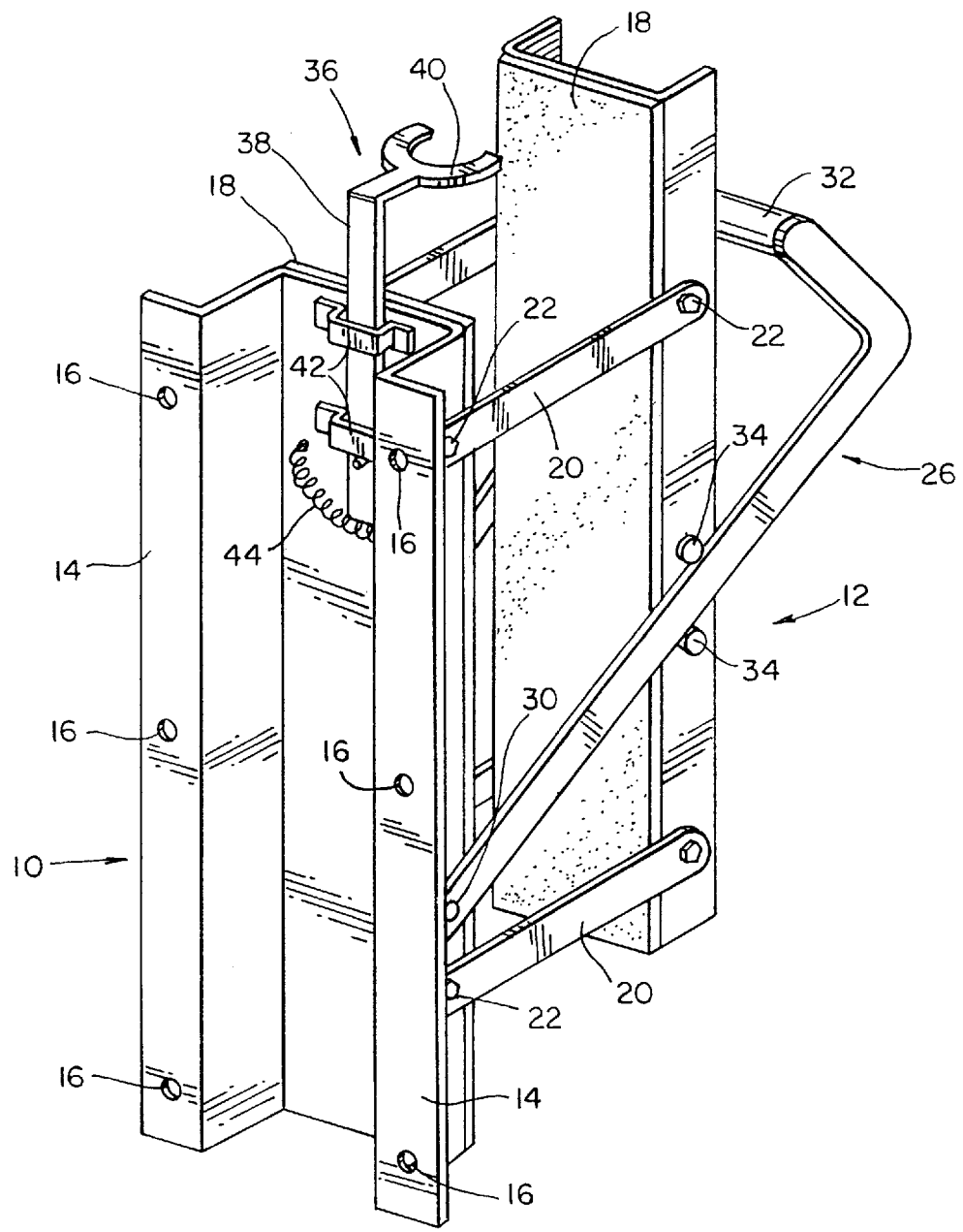
FIG. 4 illustrates conceptually and in perspective an embodiment of the present invention incorporating a bottle neck gripper.

If deemed advantageous, the apparatus of the present invention may incorporate a device for holding a container between the presser members. As shown in FIG. 4, the stationary presser member 10 is equipped with a bracket 36 for holding a bottle between the presser members. The bracket includes a strut 38 carrying a formation 40 for gripping a bottle neck. If needed to accommodate downward movement of the bottle neck during a crushing operation, the strut may be movable through guides 42 and biased upwardly by a spring 44 Alternatively, the strut may be formed by outwardly biased telescoping sections. Also, the strut may be flexible to accommodate other movement of the bottle neck during a crushing operation. The bracket may alternatively be applied to the movable presser member.

Figure 5:
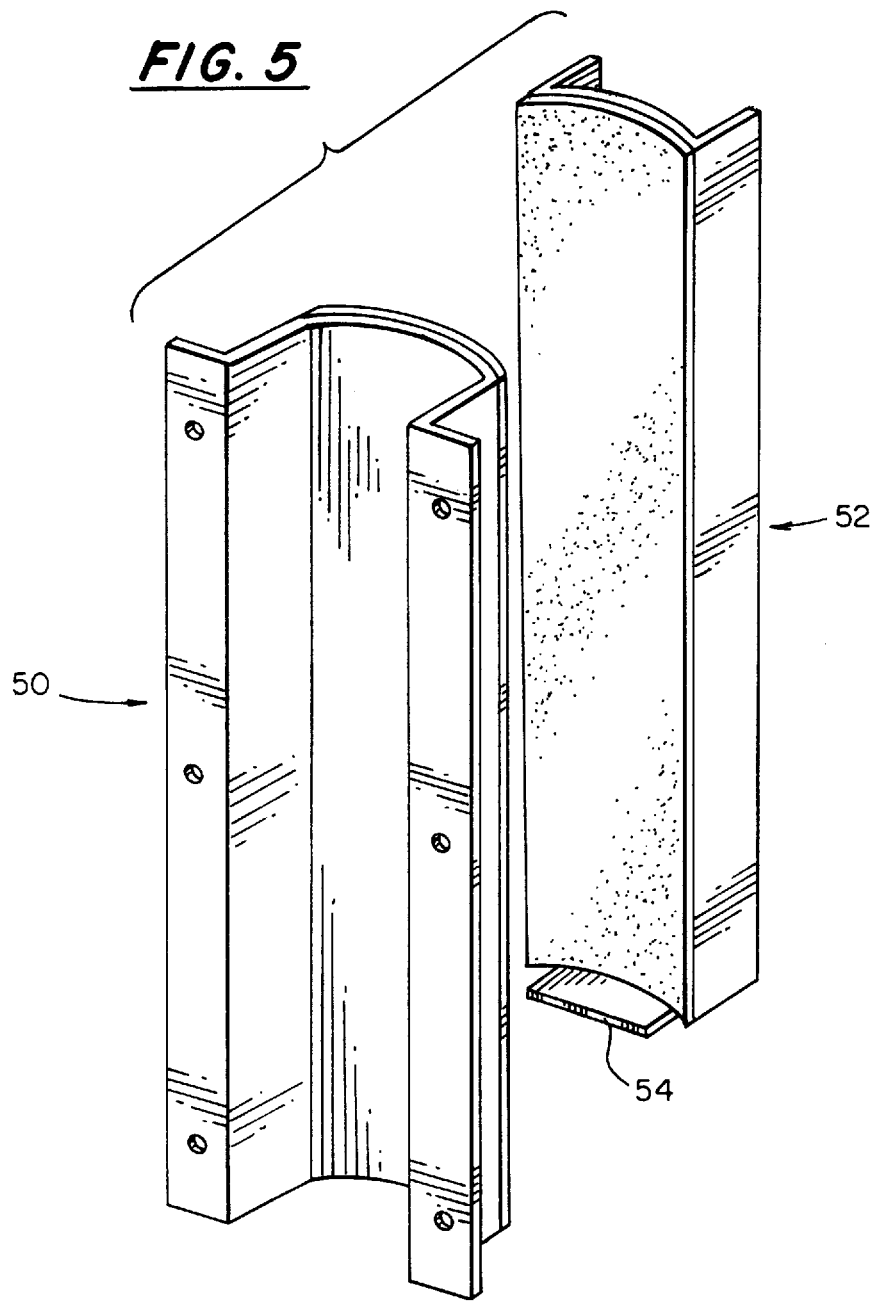
FIG. 5 illustrates conceptually and in perspective another embodiment of the present invention incorporating curved presser members as well as a container support ledge.

The confronting surfaces of the presser members need not be flat and may be curved from side to side, like the stationary and movable presser members 50, 52 illustrated in FIG. 5. The convex curvature of the stationary presser member and the matching concave curvature of the movable presser member may facilitate the collapse of a cylindrical-walled container by tucking the container base and sidewall into the opposed concave container sidewall. Like the presser members in the earlier-described embodiment, the confronting curved surfaces of these presser members carry an elastomeric material. One of these presser members may be equipped, as shown, with a support ledge 54 for the base of a container. As presser member 52 moves along an arcuate path during a crushing operation, the ledge moves beneath the lower end of stationary presser member 50. The support ledge may also be applied to one of the presser members in the earlier-described embodiment of the present invention.

What is claimed is:

1. An apparatus for crushing containers comprising:

a stationary member having a pressing surface circumscribed by laterally spaced sides and longitudinally spaced ends;

a movable member having a pressing surface circumscribed by laterally spaced sides and longitudinally spaced ends, the pressing surface of the movable member being disposed in confronting relation to the pressing surface of the stationary member;

first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other, the first means comprising links extending between the members and pivotally connected to a side of each of the members; and second means for effecting movement of the movable member between the first and second positions, said second means comprising a lever pivotally connected to the stationary member and slidably engaging at least one projection on the movable member.

2. The apparatus for crushing containers as recited in claim 1 wherein, in the second position, the pressing surfaces of the members are wholly separated from each other by a space which will accommodate a crushed container.

3. The apparatus for crushing containers as recited in claim 1 wherein, in the second position, the pressing surfaces of the members are in engagement.

4. The apparatus for crushing containers as recited in claim 1 wherein:

there are at least two pairs of links extending between the members;

the links in each pair of links are separated from each other in a lateral direction;

the pairs of links are separated from each other in a longitudinal direction; and the arcuate path of movement of the movable member is aligned with the longitudinal direction.

5. The apparatus for crushing containers as recited in claim 1 wherein the lever is provided with a hand grip.

6. The apparatus for crushing containers as recited in claim 1 wherein an elastomeric material is provided on the pressing surface of each member.

7. The apparatus for crushing containers as recited in claim 1 and further comprising third means for supporting a container between the members.

8. The apparatus for crushing containers as recited in claim 7 wherein the third means comprises a bracket carried by one of the members, the bracket including a formation for gripping the neck of a container to be crushed.

9. The apparatus for crushing containers as recited in claim 8 wherein the bracket is carried on the stationary member.

10. The apparatus for crushing containers as recited in claim 9 wherein the bracket is mounted on the stationary member for movement along a path generally parallel to the pressing surface of the stationary member.

11. The apparatus for crushing containers as recited in claim 7 wherein the third means comprises a ledge carried on the movable member and projecting toward the stationary member.

12. The apparatus for crushing containers as recited in claim 1 wherein:

the pressing surfaces of the members exhibit matching curvatures from side to side; and the arcuate path of movement of the movable member is aligned with the longitudinal direction between the ends.

13. The apparatus for crushing containers as recited in claim 12 wherein the pressing surface curvature of the stationary member is convex and the pressing surface curvature of the movable member is concave.

14. An apparatus for crushing containers comprising:

a stationary member having a pressing surface;

a movable member having a pressing surface disposed in confronting relation to the pressing surface of the stationary member;

first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other; and second means for effecting movement of the movable member between the first and second positions, said second means comprising lever arms embracing side edges of the stationary and movable presser members, each lever arm being pivotally connected to the stationary member and slidably engaging a projection on a side edge of the movable member.

15. An apparatus for crushing containers comprising:

a stationary member having a pressing surface;

a movable member having a pressing surface disposed in confronting relation to the pressing surface of the stationary member;

first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other, wherein the first means comprises at least two pairs of links extending between the members and pivotally connected to each of the members, the links in each pair of links are separated from each other in a lateral direction, the pairs of links are separated from each other in a longitudinal direction, and the arcuate path of movement of the movable member is aligned with the longitudinal direction; and second means for effecting movement of the movable member between the first and second positions, said second means comprising a lever connected between the members.

16. An apparatus for crushing containers comprising:

a stationary member having a pressing surface on which is provided an elastomeric material;

a movable member having a pressing surface on which is provided an elastomeric material, the pressing surface of the movable member being disposed in confronting relation to the pressing surface of the stationary member;

first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other; and second means for effecting movement of the movable member between the first and second positions, said second means comprising a lever connected between the members.

17. An apparatus for crushing containers comprising:

a stationary member having a pressing surface;

a movable member having a pressing surface disposed in confronting relation to the pressing surface of the stationary member;

first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other;

second means for effecting movement of the movable member between the first and second positions, said second means comprising a lever connected between the members; and third means for supporting a container between the members, wherein the third means comprises a bracket carried by one of the members, the bracket including a formation for gripping the neck of a container to be crushed.

18. The apparatus for crushing containers as recited in claim 17 wherein the bracket is carried on the stationary member.

19. The apparatus for crushing containers as recited in claim 18 wherein the bracket is mounted on the stationary member for movement along a path generally parallel to the pressing surface of the stationary member.

20. An apparatus for crushing containers comprising:

a stationary member having a pressing surface;

a movable member having a pressing surface disposed in confronting relation to the pressing surface of the stationary member;

first means for constraining the movable member for movement along an arcuate path toward and away from (1) a first position in which the pressing surfaces of the members are wholly separated from each other by a space which will accommodate a container to be crushed and (2) a second position in which the pressing surfaces of the members are closer to each other;

second means for effecting movement of the movable member between the first and second positions, said second means comprising a lever connected between the members; and third means for supporting a container between the members, wherein the third means comprises a ledge rigidly carried on the movable member and projecting toward the stationary member.

21. An apparatus for crushing containers comprising:

a stationary member having a pressing surface circumscribed by laterally spaced sides and longitudinally spaced ends, the pressing surface exhibiting a curvature from side to side;

a movable member having a pressing surface circumscribed by laterally extending sides and longitudinally spaced ends, the pressing surface of the movable member (1) exhibiting a curvature from side to side which matches the pressing surface curvature of the stationary member and (2) being disposed in confronting relation to the pressing surface of the stationary member;

first means for constraining the movable member for movement along an arcuate path aligned with the longitudinal direction between the ends of the members and toward and away from (1) a first position in which the pressing surfaces of the members are wholly separated from each other by a space which will accommodate a container to be crushed and (2) a second position in which the pressing surfaces of the members are closer to each other.

22. The apparatus for crushing containers as recited in claim 21 wherein the pressing surface curvature of the stationary member is convex and the pressing surface curvature of the movable member is concave.

* * * * *